(12) United States Patent
Gullentops et al.

(10) Patent No.: US 9,216,566 B2
(45) Date of Patent: Dec. 22, 2015

(54) IMAGING APPARATUS AND METHOD FOR MAKING FLEXOGRAPHIC PRINTING MASTERS

(75) Inventors: Chris Gullentops, Kessel-Lo (BE); Eddie Daems, Herentals (BE); Luc Vanmaele, Lochristie (BE)

(73) Assignee: AGFA GRAPHICS NV, Mortsel (BE)

( * ) Notice: Subject to any disclaimer, the term of this patent is extended or adjusted under 35 U.S.C. 154(b) by 1005 days.

(21) Appl. No.: 13/130,062

(22) PCT Filed: Dec. 1, 2009

(86) PCT No.: PCT/EP2009/066096
§ 371 (c)(1),
(2), (4) Date: May 19, 2011

(87) PCT Pub. No.: WO2010/069748
PCT Pub. Date: Jun. 24, 2010

(65) Prior Publication Data
US 2011/0219973 A1    Sep. 15, 2011

Related U.S. Application Data

(60) Provisional application No. 61/139,638, filed on Dec. 22, 2008.

(30) Foreign Application Priority Data

Dec. 19, 2008   (EP) .................................... 08172285

(51) Int. Cl.
*B41C 1/00* (2006.01)
*B41N 1/12* (2006.01)
(Continued)

(52) U.S. Cl.
CPC ............. *B41C 1/003* (2013.01); *B29C 67/0059* (2013.01); *B41F 5/24* (2013.01); *B41N 1/12* (2013.01); *B41N 1/22* (2013.01)

(58) Field of Classification Search
CPC ....... B41C 1/003; B29C 67/0059; B41F 5/24; B41N 1/12; B41N 1/16; B41N 1/22; B41M 1/04
USPC ........... 101/401.1, 401, 379; 427/511, 9, 492; 347/1, 95; 430/136
See application file for complete search history.

(56) References Cited

U.S. PATENT DOCUMENTS 4,934,267 A *  6/1990  Hashimoto et al. ........... 101/395
6,521,390 B1    2/2003  Leinenbach et al.
(Continued)

FOREIGN PATENT DOCUMENTS

DE    101 59 084 A1    6/2003
EP    1 428 666 A1     6/2004
(Continued)

OTHER PUBLICATIONS

Official Communication issued in International Patent Application No. PCT/EP2009/066096, mailed on Mar. 11, 2010.
(Continued)

*Primary Examiner* — Blake A Tankersley
(74) *Attorney, Agent, or Firm* — Keating and Bennett, LLP

(57) ABSTRACT

A method for making a flexographic printing master includes the steps of providing a flexographic printing support; providing an inkjet printing device; applying a mesa relief on the flexographic printing support with the inkjet printing device; and applying an image relief with the inkjet printing device on the mesa relief. A method for making a flexographic printing master includes the imaging apparatus.

8 Claims, 4 Drawing Sheets

(51) Int. Cl.
*B41N 1/22* (2006.01)
*B41F 5/24* (2006.01)
*B29C 67/00* (2006.01)

(56) References Cited

U.S. PATENT DOCUMENTS

| | | |
|---|---|---|
| 6,806,018 B2 | 10/2004 | Kanga et al. |
| 7,226,709 B1 | 6/2007 | Kidnie et al. |
| 2002/0163557 A1 | 11/2002 | Du et al. |
| 2004/0131778 A1 | 7/2004 | Verhoest et al. |
| 2004/0259022 A1 | 12/2004 | Hiller et al. |
| 2005/0212184 A1 | 9/2005 | Filzmoser et al. |
| 2005/0247222 A1* | 11/2005 | McLean et al. ............ 101/401.1 |
| 2006/0055761 A1 | 3/2006 | Daems et al. |
| 2007/0195126 A1 | 8/2007 | Kusunoki |
| 2009/0197013 A1* | 8/2009 | Gouch et al. .................. 427/558 |

FOREIGN PATENT DOCUMENTS

| | | | |
|---|---|---|---|
| EP | 1 594 005 A2 | 11/2005 | |
| JP | 06255132 * | 9/1994 | ............... B41J 2/205 |
| JP | 2008105245 * | 5/2008 | ............... B41N 1/12 |
| WO | 97/48557 A2 | 12/1997 | |
| WO | 2004/009364 A1 | 1/2004 | |

OTHER PUBLICATIONS

Daems et al., "Inkjet Printing Apparatus and Method for Making Flexographic Printing Masters," U.S. Appl. No. 13/130,061, filed May 19, 2011.

* cited by examiner

IMAGING APPARATUS AND METHOD FOR MAKING FLEXOGRAPHIC PRINTING MASTERS

CROSS-REFERENCE TO RELATED APPLICATIONS

This application is a 371 National Stage Application of PCT/EP2009/066096, filed Dec. 1, 2009. This application claims the benefit of U.S. Provisional Application No. 61/139,638, filed Dec. 22, 2008, which is incorporated by reference herein in its entirety. In addition, this application claims the benefit of European Application No. 08172285.2, filed Dec. 19, 2008, which is also incorporated by reference herein in its entirety.

BACKGROUND OF THE INVENTION

1. Field of the Invention

The present invention relates to a method for making a flexographic printing master by inkjet printing and an imaging apparatus for performing the method.

2. Description of the Related Art

Flexography is commonly used for high-volume runs of printing on a variety of supports such as paper, paperboard stock, corrugated board, films, foils and laminates. Packaging foils and grocery bags are prominent examples.

Today flexographic printing forms are made by both analogue imaging techniques such as a UV exposure through a film mask, e.g. EP 1594005 (DUPONT), and digital imaging techniques which include:

- direct laser engraving on flexographic printing form precursors, e.g. US 2004/0259022 (BASF);
- UV exposure through a LAMS mask, e.g. U.S. Pat. No. 6,521,390 (BASF) and U.S. Pat. No. 7,226,709 (KODAK), wherein LAMS means Laser Ablative Mask System;
- Mask-less direct UV or violet exposure by laser or LED, e.g. U.S. Pat. No. 6,806,018 (MACDERMID); and
- Inkjet printing e.g. EP 1428666 A (AGFA), US 2004/0131778 A (AGFA) and US 2006/0055761 (AGFA).

EP 1428666 A (AGFA) discloses a method for making a flexographic printing form by jetting subsequent layers of a UV-curable liquid, having elastomeric properties after being cured. Before jetting the following layer each previous layer is immobilized by a UV curing step. This "layer after layer" recording technique allows the gradual building up of a flexographic printing master wherein the relief can be accurately controlled. Use can be made of different curable liquids or immobilisation steps to obtain different layer characteristics.

Advantages of such a method for preparing a flexographic printing master are the absence of any processing steps and the consumption of no more material as necessary to form a suitable relief image, i.e. the removal of non printing areas is no longer required.

However, it has been observed that inkjet printed flexographic printing masters are more susceptible to damage during the handling before flexographic printing. Also during printing very small printing dots on the flexographic printing master can break off.

A need exists for making flexographic printing masters by inkjet printing in a short manufacturing time, which exhibit high printing quality and are less susceptible to damage.

SUMMARY OF THE INVENTION

It was found that the above cited problems could be solved by changing the topography of the relief and including a so-called "mesa-relief", which can be seen as a common base relief for neighbouring image reliefs. In order to keep a short manufacturing time of the flexographic master, preferably an imaging apparatus is used which has an inkjet printing device with two sets of inkjet nozzles, wherein the first set of nozzles has a nozzle diameter which is at least 25% smaller than a nozzle diameter of the second set nozzles.

In order to overcome the problems described above, preferred embodiments of the present invention provide a method for making a flexographic printing master as defined below.

A preferred embodiment of the present invention provides an imaging apparatus for making a flexographic printing master as defined below.

Further advantages and benefits of the present invention will become apparent from the description hereinafter.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Methods for Making Flexographic Printing Master

A method for making a flexographic printing master according to a preferred embodiment of the present invention comprises the steps of:

a) providing a flexographic printing support (1);
b) providing an inkjet printing device (32);
c) applying a mesa relief (40) on the flexographic printing support (1) with the inkjet printing device (32); and
d) applying an image relief (38) with the inkjet printing device on the mesa relief (40).

A relief is applied by an inkjet printing device by applying image-wise on a support subsequent layers of radiation curable liquid by an inkjet printing device whereby an applied layer is preferably immobilized using a curing device before a subsequent layer is applied. The curing does not have to be a full cure, but can be a partial cure. Optionally some of the layers are not cured directly after jetting the layer, but after jetting of a subsequent layer. In a preferred embodiment, each applied layer is immobilized using the curing device before a subsequent layer is applied.

Figure 1:
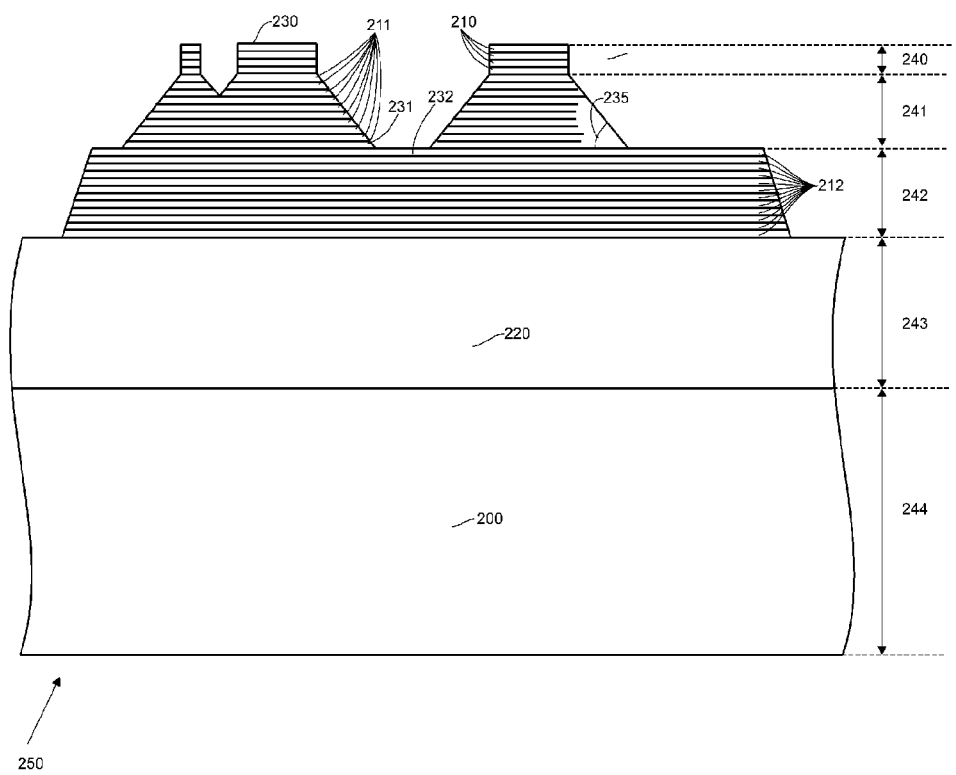
FIG. 1 shows a cross section of a preferred embodiment of the flexographic printing master.

In a preferred embodiment of the present invention of the method for making a flexographic printing master, the relief includes a so-called "mesa relief" as shown by the flexographic printing master (250) in FIG. 1. The layers (212) together define a "mesa relief". Such a mesa relief is only present in those parts of the flexographic printing master comprising image features such as text, graphics and halftone images. In extended areas where such image features are absent, there is no mesa relief.

A mesa relief preferably has a height (242) in a range from 50 μm to 1 mm, for example 0.5 mm.

The layers (210), (211) and (212) in FIG. 1 define the actual printing relief of the flexographic printing master. The layers (210) and (211) in FIG. 1 define the image relief. The top layer (230) corresponds with a halftone bitmap that defines the image that is to be printed by the printing master. The layers (210) are preferably identical in shape and size as the top layer (230), producing a vertical relief slope and defining a "top hat segment". Such a top hat may have a height (240) between 10 and 500 μm and preferably between 20 and 200 μm. A vertical relief slope for a top hat segment has the advantage that the printing surface remains constant during printing, even when pressure variations occur between the print master and the anilox roller or between the print master and the printable substrate, or when the printing master wears off.

The intermediate layers (211), together forming a sloped segment, are preferably printed with a slope having an angle (235) that is less than 90 degrees. The angle can be between 25 and 75 degrees, preferably between 40 and 60 degrees, for example 50 degrees. The angle (235) can be controlled by controlling the height (241) of the individual layers, their number and the difference in size between subsequent layers.

Using a lower slope angle (235) has the advantage that small features on the print master will suffer less from buckling. The total height (241) of the intermediate layers (211) is for example between 30 μm and 700 μm, preferably between 50 μm and 250 μm.

In a more preferred embodiment of the current invention, the intermediate layers (210), (211) and (212) are printed in multiple passes with an ink jet printer that jets a radiation curable liquid in combination with a curing device. Each intermediate layer is solidified by a curing device immediately after printing. Especially the upper layer (232) of the mesa relief is preferably only partially cured for ensuring a good adhesion with the lowest intermediate layer (231) of the sloped segment (211). Optionally a final curing step is carried out to further harden the layers after all of them have been printed.

The mesa relief is preferably printed on an elastomeric support floor (220) that provides the necessary resilience to the flexographic printing master. Such an elastomeric floor can, for example, be obtained by layer-wise spraying or jetting a radiation curable liquid on the support and curing the layers by a UV curing source. The height (243) of an elastomeric floor (220) is preferably between 0.3 mm and 2 mm.

The elastomeric floor (220) may itself be supported by a support (200). A support (200) of a sheet form typically has a height (244) from 0.005 to 0.127 cm. A preferred height (244) for the sheet form is 0.007 to 0.040 cm. A sleeve form typically has a wall height (244) from 0.1 to 1 mm for thin sleeves and from 1 to as much as 100 mm for other sleeves. The selection of the height (244) depends upon the application.

Mesa Reliefs

In a preferred embodiment of the method according to the present invention the mesa relief is grinded. This results in a flattened top surface of the mesa relief which is advantageous for the image quality of the image relief to be jetted thereon and improves the adhesion of the image relief to the mesa relief.

In one preferred embodiment, the mesa relief in different image areas of the flexographic printing master has the same height. However, it is not necessary that the height of the mesa relief is of identical height over the whole flexographic printing master. In another preferred embodiment of the method according to the present invention, the flexographic printing master includes at least two mesa reliefs of a different height. In image areas lacking fine image details, i.e. less susceptible to damage, a smaller height can be tolerated resulting in less material to be jetted which represents an economical advantage.

In order to increase manufacturing speed of a flexographic printing master, preferably use is made of an inkjet printing device including a first and a second set of nozzles, wherein a nozzle diameter of a nozzle of the first set of nozzles is at least 25% larger than a nozzle diameter of a nozzle of the second set nozzles. In making the printing relief on the flexographic printing support, the first set of nozzles having a larger nozzle diameter is used for printing the mesa relief on the flexographic printing support and the second set of nozzles is used for printing the image relief on the mesa relief.

Image Reliefs

The image relief is a relief jetted on the mesa relief according to an image to be printed with flexography on a substrate.

A preferred embodiment of the method according to the present invention provides an image relief including a top hat profile of which the top hat segment is preferably grinded. Such a top hat profile is well known to the skilled person in flexography. For example, EP 1428666 A (AGFA) discloses in FIG. 5 such a top hat profile made by inkjet printing.

Figure 2:
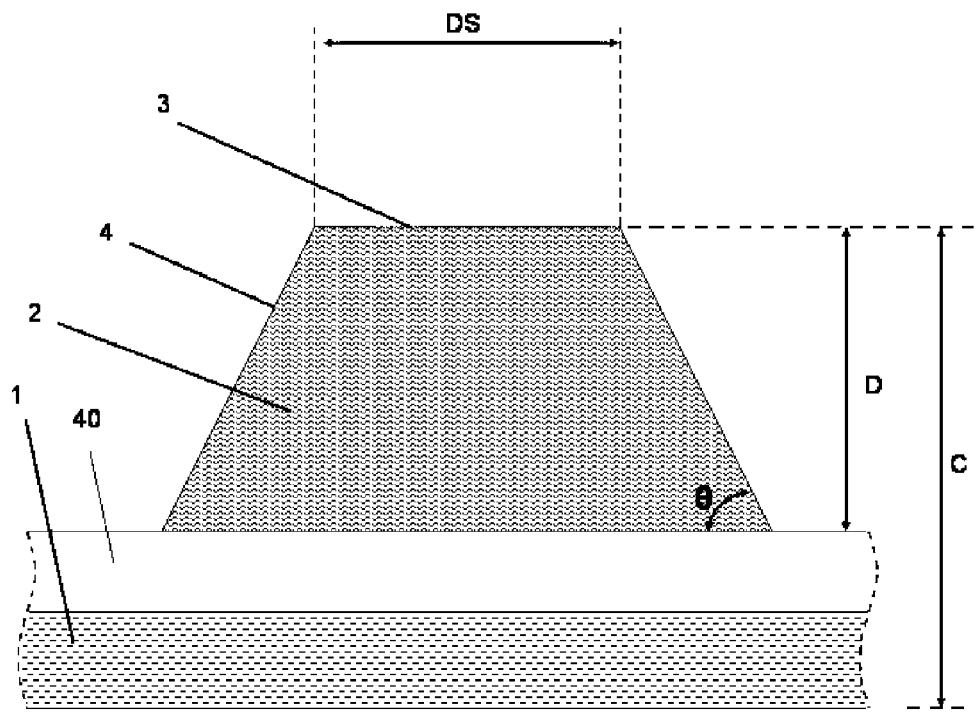
FIG. 2 shows a cross-section of a relief dot on a flexographic printing master having a regular profile.
Figure 3:
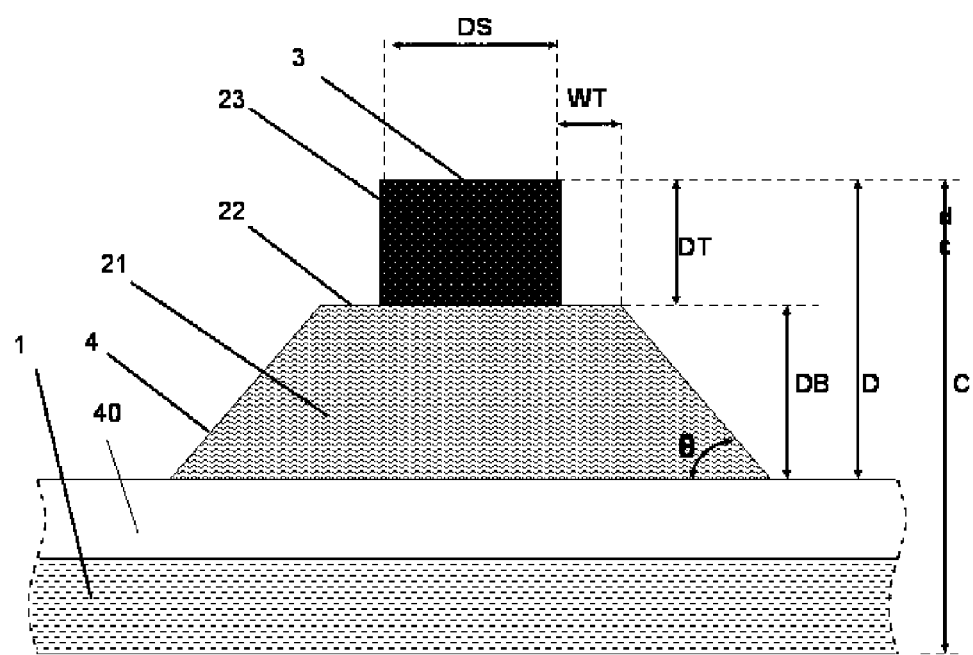
FIG. 3 shows a cross-section of a relief dot on a flexographic printing master having a top hat profile.

Alternatively, it is also possible that the image relief has a "regular" profile. Flexographic printing forms made by an analogue imaging technique such as a UV exposure through a mask results in a relief having a "regular" profile as shown in FIG. 2. It is not possible to make a relief having a "top hat" profile as shown in FIG. 3 by UV exposure through a mask. A relief having a "top hat" profile can only be made by laser engraving or by inkjet printing. The relief having a "regular" profile of FIG. 2 consists of an image relief (2) on a mesa relief (40) previously printed on a flexographic printing support (1). The shoulder (4) of the relief (2) has a slope with a slope angle Θ which is created by light scattering in a photopolymerizable layer when exposing through a mask the flexographic printing precursor to UV light. The unexposed areas of the polymerizable layer are removed, for example, by a suitable solvent. The relief of such a flexographic printing master has the same height D over the whole surface, because the flexographic printing precursor uses a polymerizable layer of uniform thickness. The total height C of the flexographic printing master is called the caliper. The diameter DS of the printing surface (3) determines the dot size of a dot printed with the flexographic printing master.

With inkjet printing it is possible to obtain an image relief having a "top hat" profile as shown in FIG. 3. Such a relief includes a sloped segment (21) jetted on a mesa relief (40) previously printed on a flexographic printing support (1). On the plateau (22) of the sloped segment (21) a top hat segment (23) can be printed having a printing surface (3). The top hat segment (23) may have a diameter DS which is smaller than the diameter of the plateau (22), resulting in an area of the plateau having a width WT not covered by the top hat segment (23). Alternatively the diameter DS of the top hat segment (23) may match the diameter of the plateau. In the latter the width WT of the plateau is equal to zero. The top hat segment (23) has a certain height DT, which is preferably between 10 to 500 μm high, more preferably 20 to 200 μm high. The advantage of a top hat profile is that in rubbing off material, e.g. by wear of the flexographic printing master, no physical growth in dot size or broadening of lines is observed, whereas physical growth in dot size or line broadening is observed when using a relief having a "regular" profile as shown by FIG. 2. Preferably the sloped segment (21) made by inkjet printing also has a shoulder (4) with a slope angle Θ. This results in a more robust flexographic printing master. A flexographic printing master can be made wherein the slope angle Θ is equal to 90° C., in which case DT is equal to D and the sloped segment height DB is equal to zero. However, such a profile is not preferred, especially not when the relief includes small dots or thin lines. These small dots and thin lines are very vulnerable and can be easily broken off during flexographic printing.

Figure 4:
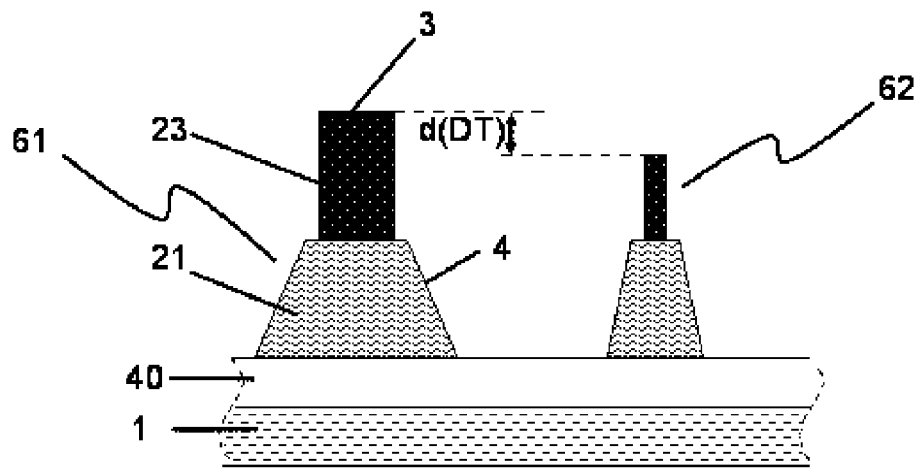
FIG. 4 shows a cross-section of a large relief dot and a small relief dot on a flexographic printing master both having a top hat profile but with different heights of the top hat segment.

A relief on a flexographic printing master generally comprises relief dots having different diameters. In inkjet printing a large relief dot (61) and a small relief dot (62) generally a difference in caliper is seen, as shown in FIG. 4. The smaller relief dots are less high than the larger relief dots by a difference in height d(DT) between the top hat segments of the large relief dot (61) and the small relief dot (62). Grinding of such a relief leads to a relief wherein all relief dots and lines have the same caliper. Flexographic printing with such a grinded relief results in flexographic printed images wherein also the small image details are present.

The top hat profile does not need to have a uniform chemical composition. By changing chemical composition properties such as flexibility and hardness can be advantageously influenced to produce flexographic images of better image quality. In one preferred embodiment, the top hat profile has a chemical composition of the sloped segment differing from the chemical composition of the top hat segment. In a preferred embodiment the top hat segment has a Shore A hardness which is higher than that of the sloped segment.

Imaging Apparatuses

An imaging apparatus for making a flexographic printing master according to a preferred embodiment of the present invention comprises
a) a rotatable drum (31) for holding a flexographic printing support (1);
b) an inkjet printing device (32) including a first and second set of nozzles for printing a relief on the flexographic printing support (1); and
c) a curing device (39) for curing the relief on the flexographic printing support (1);
wherein a nozzle diameter of a nozzle of the first set of nozzles is at least 25% larger than a nozzle diameter of a nozzle of the second set nozzles.

In a preferred embodiment of the imaging apparatus according to the present invention, the nozzle diameter of a nozzle of the second set of nozzles is smaller than 40 μm and more preferably smaller than 25 μm. This allows that an image of high resolution can be produced by flexography.

In a preferred embodiment of the imaging apparatus according to the present invention, the inkjet printing device contains an inkjet print head containing the first set of nozzles and an inkjet print head containing the second set of nozzles. Alternatively the imaging apparatus according to a preferred embodiment of the present invention may include an inkjet print head containing the first set of nozzles and the second set of nozzles.

In a preferred embodiment of the imaging apparatus according to the present invention, the apparatus includes a device to move a print head during printing in both a horizontal and a vertical direction.

In a preferred embodiment, the imaging apparatus according to the present invention further comprises a grinding device (35) having a grinding surface for grinding the surface of the relief. When a grinding device is present in the imaging apparatus, then preferably also a device to remove the grinded material is present.

Figure 5:
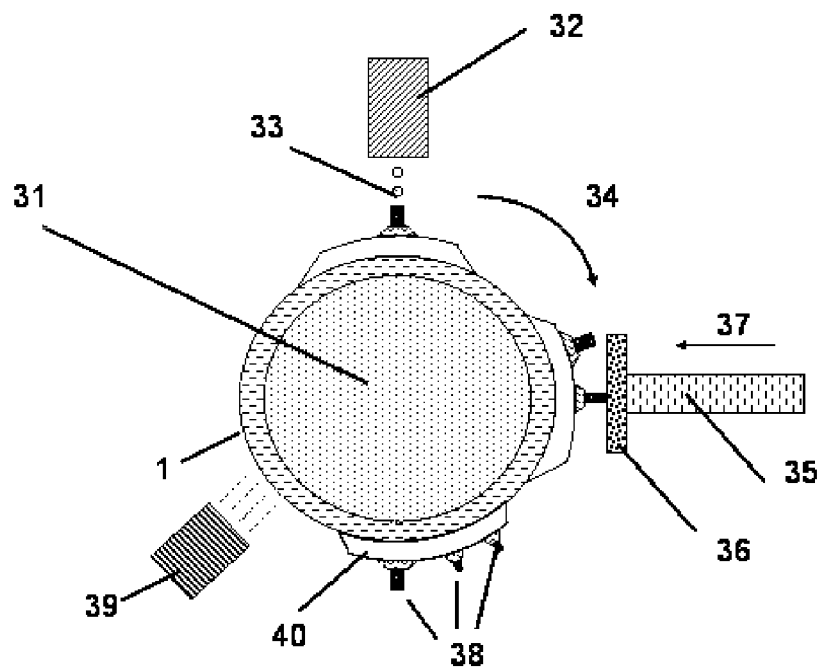
FIG. 5 shows a cross-section of an imaging apparatus according to a preferred embodiment of the present invention for making a flexographic printing master.
Figure 6:
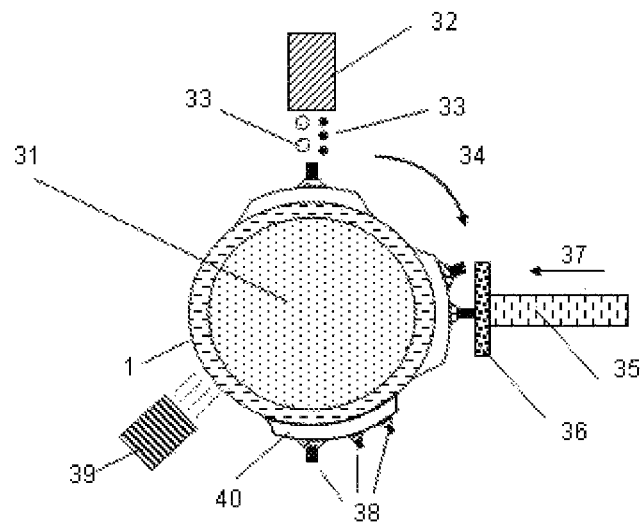
FIG. 6 shows a cross-section of an imaging apparatus according to a preferred embodiment of the present invention, wherein the inkjet print head (32) includes both a first set and a second set of nozzles, and a diameter of the first set of nozzles (left hand nozzles) is at least 25% larger than a diameter of the second set of nozzles (right hand nozzles).
Figure 7:
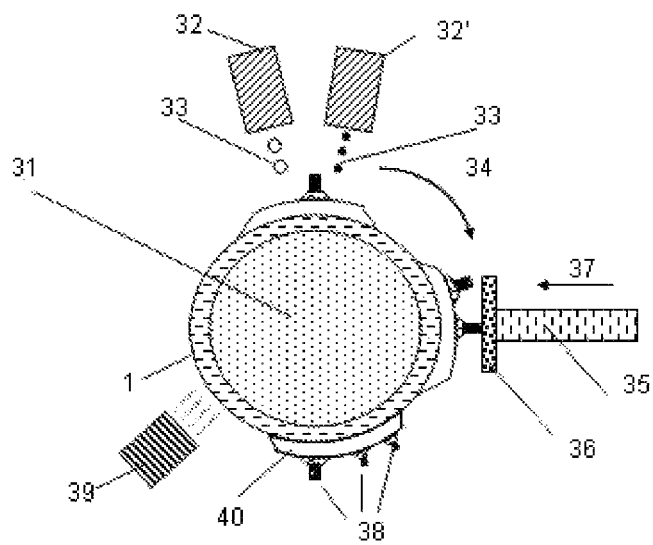
FIG. 7 shows a cross-section of an imaging apparatus according to a preferred embodiment of the present invention, wherein the apparatus includes first and second inkjet print heads, and the diameter of the first set of nozzles in the first inkjet print head (32) is at least 25% larger than the diameter of the second set of nozzles in the second inkjet print head (32').

A preferred embodiment of the imaging apparatus is schematically shown in FIG. 5 where a flexographic printing support (1) is mounted upon a rotatable drum (31) having a rotation direction (34). An inkjet print head (32) jets imagewise droplets (33) towards the rotatable drum (31) to form a layer on the flexographic support (1) which is then immobilized by the curing device (39) before a subsequent layer is applied by the inkjet print head (32). Through rotation of the rotatable drum (31) and applying subsequent layers, a printing relief is formed consisting of a mesa relief (40) and an image relief with a top hat profile (38). After the mesa relief and/or the image relief is formed a grinding device (35) is moved in a direction (37) preferably perpendicular on the surface of the rotatable drum (31). The grinding device includes a grinding surface (36) of which the distance the printing surface of the relief can be accurately controlled, preferably on a micrometer scale. The grinding surface (36) is brought into a position where it grinds part of the top hat segment away, such that the whole relief obtains the same caliper and a printing surface having the desired flatness and evenness.

A relief on a flexographic printing master generally comprises relief dots having different diameters. In inkjet printing a large relief dot (61) and a small relief dot (62) generally a difference in caliper is seen, as shown in FIG. 4. The smaller relief dots are less high than the larger relief dots by a difference in height d(DT), as shown in FIG. 4 between the top hat segments of the large relief dot (61) and the small relief dot (62). Grinding of such a relief leads to a relief wherein all relief dots and lines have the same caliper. Flexographic printing with such a grinded relief results in images wherein also the small image details are present.

It should be clear that the inkjet printing device and the grinding device are positioned in such a manner that grinded material from the grinding process does not interfere with the inkjet printing device for making subsequently other flexographic printing masters, e.g. through clogging of an inkjet nozzle by dust particles generated by the grinding process. The skilled person is well aware of methods and devices to physically separate the inkjet printing device and the grinding device, such as for example:
    positioning the inkjet print head (32) in a closed maintenance station;
    positioning a separation wall (not shown in FIG. 5) between the inkjet print head (32) and the grinding device (35);
    selecting around the rotatable drum (31) a suitable angle between the inkjet print head (32) and the grinding device (35) of e.g. 90° or even up to a preferred 180°; and
    providing a device to remove dust particles generated by the grinding process e.g. by air suction and/or brushes.

In one preferred embodiment, the grinding process can also be performed off-line, i.e. not on the apparatus containing the inkjet printing device but on a second apparatus containing a grinding device. Although no clogging of inkjet nozzles can then occur, the off-line grinding is less preferred because it requires extra manutention for de-mounting and re-mounting of the flexographic printing form, which is not desirable from an economical point of view.

Device for Inkjet Printing

The device for inkjet printing includes any device capable of coating a surface by breaking up a radiation curable liquid into small droplets which are then directed onto the surface. In the most preferred embodiment the radiation curable liquids are jetted by one or more printing heads ejecting small droplets in a controlled manner through nozzles onto a flexographic printing support, which is moving relative to the printing head(s).

A preferred printing head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with radiation curable liquid. When the voltage is again removed, the ceramic expands to its original shape, ejecting a drop of liquid from the print head. However the inkjet printing method is not restricted to piezoelectric inkjet printing. Other inkjet printing heads can be used and include various types, such as a continuous type and thermal, electrostatic and acoustic drop on demand type.

At high printing speeds, the radiation curable liquids must be ejected readily from the printing heads, which puts a number of constraints on the physical properties of the liquid, e.g. a low viscosity at the jetting temperature, which may vary from 25° C. to 110° C., a surface energy such that the printing head nozzle can form the necessary small droplets, a homogenous radiation curable liquid capable of rapid conversion to a dry printed area, . . . .

The inkjet printing head normally scans back and forth in a transversal direction across the moving flexographic printing support. The inkjet print head does not need to print on the way back, but bi-directional printing is preferred for reasons of productivity. Another preferred printing method is by a "single pass printing process", which can be performed by using page wide inkjet printing heads or multiple staggered inkjet printing heads which cover the entire width of the flexographic printing support. In a single pass printing process, the inkjet printing heads usually remain stationary and the flexographic printing support is transported under the inkjet printing heads, e.g. by the rotatable drum (31) described above in FIG. 5.

Device for Curing Radiation Curable Liquids

The imaging apparatus contains a device to cure (39) a radiation curable liquid. Radiation curable liquids are cured by exposing them to actinic radiation, e.g. by UV curing, by thermal curing and/or by electron beam curing. Preferably the curing is performed by UV radiation.

The curing device may be arranged in combination with the inkjet print head, travelling therewith so that the curable liquid is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by a flexible radiation conductive device such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the flexographic printing support surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light.

For curing the inkjet printed radiation curable liquid, the imaging apparatus preferably has a plurality of UV light emitting diodes. The advantage of using UV LEDs is that it allows a more compact design of the imaging apparatus.

Specifically, a UV-A light source is preferred due to the higher penetration depth therewith resulting in more efficient interior curing. UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the subsequent layers forming the relief are cured with UV-A radiation and on completing the relief, it is cured with UV-C radiation before commencing the grinding step c).

For facilitating curing, the imaging apparatus preferably includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Thermal curing can be performed image-wise e.g. by use of a thermal head or a laser beam. If a laser beam is used, then preferably an infrared laser is used in combination with an infrared dye in the curable liquid.

When electron beams are employed, the exposure amount of the electron beam is preferably controlled to be in the range of 0.1-20 Mrad. An exposure amount of less than 0.1 Mrad does not result in sufficient curing of the curable liquids. Accepted as electron beam exposure systems are, for example, a scanning system, a curtain beam system, and a broad beam system. An appropriate acceleration voltage during electron beam exposure is preferably 100-300 kV.

Grinding Device

The apparatus according to a preferred embodiment of the present invention preferably comprises a grinding device. The grinding device includes any device having a grinding surface which can be positioned accurately at a certain distance from the flexographic printing support and capable of grinding or polishing the printing surface of a flexographic printing master.

The grinding device can have any form suitable for grinding a top hat profile, such as a grinding wheel, a grinding stone, abrasive grinding paper, an abrasive cloth roll and a sanding pad.

Even commonly used sandpaper mounted in a suitable manner for grinding a flexographic printing form on a rotatable drum can be used as a grinding device. The material used for grinding usually includes abrading particles from aluminium oxide, silicon carbide, alumina-zirconium (an aluminium oxide-zirconium oxide alloy) and chromium oxide. Both coated abrasives, as well as bonded abrasives can be used.

Sandpaper may be "stearated" where a dry lubricant is loaded to the abrasive. Stearated papers are useful because this increases the useful life of the sandpaper. Aluminium Oxide with stearate is also known as PS33.

The grit size of a sand paper refers to the size of the particles of abrading materials embedded in the sandpaper. A number of different standards have been established for grit size. These standards establish not only the average grit size, but also the allowable variation from the average. The most common is the European FEPA (Federation of European Producers of Abrasives) "P" grade. The FEPA system is the same as the ISO 6344 standard. Preferred sandpapers in the present method for making a flexographic printing master have an ISO/FEPA grit designation of P240 to P2500, more preferably P320 to P1000.

The roughness of the applied sanding paper or grinding device can be advantageously used to determine the printing surface structure of the flexographic printing form.

Suitable abrasive type materials include aluminium oxide, silicon carbide, zirconium, cork, boron carbide, ceramic, garnet, diamond, CBN, tungsten carbide and copper or nickel coated abrasives.

The grinding can be performed by dry or wet grinding. Wet grinding has the advantage that dust particles generated by the grinding process are largely removed together with the applied liquid, thereby preventing clogging of the inkjet print head. For grinding top hat segments with a high Shore A hardness, the grinding liquid is preferably a cooling liquid to maintain efficient grinding.

Grinding is preferably performed bidirectionally, i.e. by rotating the rotatable drum (31) alternatively in both directions during grinding. The advantage of bidirectional grinding is that the grinding occurs uniformly and a sloped printing surface (3) is avoided.

In a more complex imaging apparatus, the grinding device is no longer some kind of physical contact grinding device but a laser. In such a case it becomes necessary to include a profilometer into the imaging apparatus; A profilometer is capable of measuring the height DT of the top hat segment, the height D or even the caliper C (see FIG. 3 for these heights). Such measuring techniques include contactless measurement, e.g. interferometry, and contact measurement, e.g. perthometry. Preferably the height measurement is contactless in order to avoid damages of the relief.

Suitable lasers include those normally used in manufacturing flexographic printing forms by direct laser engraving. Examples of such lasers are disclosed in EP 1700691 A (DAINIPPON SCREEN) incorporated herein as reference.

A preferred example of the laser is a laser having an emitting wavelength in an infrared region or near infrared region, for example, a carbon dioxide gas laser, a YAG laser, a semiconductor laser or a fibre laser. Also, an ultraviolet laser having an emitting wavelength in an ultraviolet region, for example, an excimer laser, a YAG laser wavelength-converted to the third harmonic or the fourth harmonic or a copper vapour laser is also able to conduct ablation processing which cleaves a bond between molecules of organic compound and thus is suitable for micro fabrication. A laser having an extremely high peak power, for example, a femtosecond laser can also be employed. The laser irradiation may be performed continuously or pulse wise.

Preferred lasers for laser engraving include $CO_2$-lasers and Nd-YAG lasers. For example, a Stork Agrios triple beam $CO_2$-laser can be used. Fibre lasers can also be used if, for example, a carbon black pigment is present in the radiation curable liquid.

Device for Removal of Grinded Material

In a preferred embodiment of the imaging apparatus according to the present invention some device is present to actively removing grinded top hat segment material.

The grinded top hat segment material can be removed by any appropriate method, for example:
- a method of washing out, for example, with a solvent or water optionally containing a surfactant;
- a method of spraying an aqueous cleaning agent, for example, by a high-pressure sprayer;
- a method of spraying high-pressure steam or air;
- a method employing an ultrasonic device; and
- a method of wiping off with a cloth, a brush or the like.

In one preferred embodiment the grinded top hat segment material is sucked away by an air stream, e.g. into a collector for the grinded material.

In another preferred embodiment the grinded top hat segment material is removed by a liquid, and is preferably collected on a filter system.

Flexographic Printing Supports

Two forms of flexographic printing supports can be distinguished: a sheet form and a cylindrical form (sleeve). Sleeve forms provide improved registration accuracy and faster change-over-time on press. Furthermore, sleeves may be well-suited for mounting on an inkjet printer having a rotatable drum. Seamless sleeves have applications in the flexographic printing of continuous designs such as in wallpaper, decoration, gift wrapping paper and packaging.

The term "flexographic printing support", as used in the preferred embodiments of the present invention, encompasses two types of support:
1) a support without elastomeric layers on its surface; and
2) a support with one or more elastomeric layers on its surface.

In a preferred embodiment, the flexographic printing support is a sleeve, which encompasses a basic sleeve and a flexographic printing sleeve. The term "basic sleeve" means a sleeve without elastomeric layers on its outer surface, while the term "flexographic printing sleeve" means a basic sleeve having one or more elastomeric layers on its outer surface.

Although here below the type of materials, the wall thicknesses, . . . are written for sleeves, the same type of materials, wall thicknesses, . . . can be used for flexographic printing supports having a sheet form.

Basic Sleeves

The basic sleeve can be any material that is conventionally used to prepare flexographic printing masters. For good printing results, a dimensionally stable support is required. Basic sleeves, often also called a sleeve base, ordinarily consist of composites, such as epoxy or polyester resins reinforced with glass fibre or carbon fibre mesh. Metals, such as steel, aluminium, copper and nickel, and hard polyurethane surfaces (e.g. durometer 75 Shore D) can also be used.

The sleeve may be formed from a single layer or multiple layers of flexible material, as for example disclosed by US 2002/046668 (ROSSINI). Flexible sleeves made of polymeric films can be transparent to ultraviolet radiation and thereby accommodate backflash exposure for building a floor in the cylindrical printing element. Multiple layered sleeves may include an adhesive layer or tape between the layers of flexible material. Preferred is a multiple layered sleeve as disclosed in U.S. Pat. No. 5,301,610 (DU PONT). The sleeve may also be made of non-transparent, actinic radiation blocking materials, such as nickel or glass epoxy.

Depending upon the type of tubing and the number of layers of mesh applied, the wall thickness of these sleeve bases varies. The sleeve typically has a wall thickness from 0.1 to 1.5 mm for thin sleeves and from 2 mm to as high as 100 mm for other sleeves.

For thick sleeves often combinations of a hard polyurethane surface with a low-density polyurethane foam as an intermediate layer combined with a fibreglass reinforced composite core are used as well as sleeves with a highly compressible surface present on a sleeve base.

Depending upon the specific application, sleeve bases may be conical or cylindrical. Cylindrical sleeve bases are used primarily in flexographic printing.

As press speeds have increased, press bounce has become a more frequent problem. Various approaches can be taken to reduce press bounce, including the use of cushioned sleeves. Sleeves come in different constructions, e.g. with a hard or a compressible core or surface, with varying wall thicknesses.

The basic sleeve or flexographic printing sleeve is stabilized by fitting it over a steel roll core known as an air mandrel or air cylinder. Air mandrels are hollow steel cores which can be pressurized with compressed air through a threaded inlet in the end plate wall. Small holes drilled in the cylindrical wall serve as air outlets. The introduction of air under high pressure permits it to float into position over an air cushion. Certain thin sleeves are also expanded slightly by the compressed air application, thereby facilitating the gliding movement of the sleeve over the roll core.

Foamed adapter or bridge sleeves are used to "bridge" the difference in diameter between the air-cylinder and a flexographic printing sleeve containing the printing relief. The diameter of a sleeve depends upon the required repeat length of the printing job.

Flexographic Printing Sleeves

A flexographic printing sleeve is a basic sleeve provided with one or more elastomeric layers. The elastomeric layers may be any material that is conventionally used to prepare flexographic printing masters. The elastomeric layers are preferably partially or fully cured photopolymer layers, but can also be rubber or polyurethane layers. It is also possible to use a partially or fully cured conventional UV exposure flexographic printing form precursor as flexographic printing sleeve. A wide variety of such conventional flexographic printing form precursors are commercially available.

A printing relief can be formed in several ways on the flexographic printing sleeve. In a preferred embodiment the relief is formed by inkjet printing on the one or more elastomeric layers already present as an "elastomeric floor". In the latter, the one or more elastomeric layers are preferably partially cured layers to enhance the adhesion of the relief jetted onto the elastomeric layers. Alternatively the elastomeric floor may also be applied to the surface of the basic sleeve by inkjet printing.

In another preferred embodiment, the elastomeric layers are fully cured and the relief is formed by laser engraving. In laser engraving, the elastomeric layers of a different hardness can be used to obtain the desired hardness.

In another preferred embodiment the flexographic printing sleeve is prepared by a coating method as disclosed in WO 2008/034810 (AGFA GRAPHICS).

Different types of printing applications require flexographic printing forms with differing degrees of hardness. Softer flexographic printing forms are more suited for rough substrates because they can better cover the highs and lows. The harder flexographic printing forms are used for even and smooth substrates. The optimum hardness of a flexographic printing form also depends on whether the image is solid or halftone. Softer flexographic printing forms will transfer the ink better in solid areas, though harder flexographic printing forms have less dot gain. The hardness is a measure of the printing form's mechanical properties which is measured in degree of Shore A. For example, printing on corrugated board requires usually a hardness of 35° Shore A, whereas for reel presses 65° to 75° Shore A is a standard.

Depending on the substrate to be printed upon, the hardness and thickness of the flexographic printing form have to be adjusted. Depending on the application, the relief depth varies from 0.2 to 4 mm, preferably from 0.4 to 2 mm.

Radiation Curable Liquids

The radiation curable liquid is preferably curable by actinic radiation which can be UV light, IR light or visible light. Preferably the radiation curable liquid is a UV curable liquid.

The radiation curable liquid preferably contains at least a photo-initiator and a polymerizable compound. The polymerizable compound can be a monofunctional or polyfunctional monomer, oligomer or pre-polymer or a combination thereof.

The radiation curable liquid may be a cationically curable liquid but is preferably a free radical curable liquid.

The free radical curable liquid preferably contains substantially acrylates rather than methacrylates for obtaining a high flexibility of the applied layer. Also the functionality of the polymerizable compound plays an important role in the flexibility of the applied layer. Preferably a substantial amount of monofunctional monomers and oligomers are used.

In a preferred embodiment of the present invention, the radiation curable liquid includes:
a) a photoinitiator; and
b) a polymerizable compound selected from the group consisting of lauryl acrylate, polyethyleneglycol diacrylate, polyethylene glycol dimethacrylate, 2-(2-ethoxyethoxy) ethyl acrylate, 2-phenoxyethyl acrylate, 2-phenoxyethyl methacrylate, propoxylated neopentylglycol diacrylate, alkoxylated hexanediol diacrylate, isobornylacrylate, isodecyl acrylate, hexane diol diacrylate, caprolacton acrylate and urethane acrylates.

In a more preferred embodiment of the present invention, the radiation curable liquid includes an aliphatic urethane acrylate. Aromatic type urethane acrylates are less preferred.

In an even more preferred embodiment, the urethane acrylate is a urethane monoacrylate. Commercial examples include GENOMER™ 1122 and EBECRYL™ 1039.

The flexibility of a given urethane acrylate can be enhanced by increasing the linear molecular weight between crosslinks. Polyether type urethane acrylates are for flexibility also more preferred than polyester type urethane acrylates.

Preferably the radiation curable liquid does not include amine modified polyether acrylates which reduce the flexibility of the cured layer.

An elastomer or a plasticizer is preferably present in the radiation curable liquid for improving desired flexographic properties such as flexibility and elongation at break.

The radiation curable liquid may contain a polymerization inhibitor to restrain polymerization by heat or actinic radiation.

The radiation curable liquid may contain at least one surfactant for controlling the spreading of the liquid.

The radiation curable liquid may further contain at least one colorant for increasing contrast of the image on the flexographic printing master.

The radiation curable liquid may further contain at least one acid functionalized monomer or oligomer.

The radiation curable liquid preferably has a viscosity at a shear rate of $100\ s^{-1}$ and at a temperature between 15 and 70°

C. of not more than 100 mPa·s, preferably less than 50 mPa·s, and more preferably less than 15 mPa·s.

Monofunctional Monomers

Any polymerizable monofunctional monomer commonly known in the art may be employed. Particular preferred polymerizable monofunctional monomers are disclosed in paragraphs [0054] to [0058] of EP 1637926 A (AGFA).

Two or more monofunctional monomers can be used in combination.

The monofunctional monomer preferably has a viscosity smaller than 30 mPa·s at a shear rate of 100 s$^{-1}$ and at a temperature between 15 and 70° C.

Polyfunctional Monomers and Oligomers

Any polymerizable polyfunctional monomer and oligomer commonly known in the art may be employed. Particular preferred polyfunctional monomers and oligomers are disclosed in paragraphs [0059] to [0063] of EP 1637926 A (AGFA).

Two or more polyfunctional monomers and/or oligomers can be used in combination.

The polyfunctional monomer or oligomer preferably has a viscosity larger than 50 mPa·s at a shear rate of 100 s$^{-1}$ and at a temperature between 15 and 70° C.

Acid Functionalized Monomers and Oligomers

Any polymerizable acid functionalized monomer and oligomer commonly known in the art may be employed. Particular preferred acid functionalized monomers and oligomers are disclosed in paragraphs [0066] to [0070] of EP 1637926 A (AGFA).

Photo-Initiators

The photo-initiator, upon absorption of actinic radiation, preferably UV-radiation, forms free radicals or cations, i.e. high-energy species inducing polymerization and crosslinking of the monomers and oligomers in the radiation curable liquid.

A preferred amount of photo-initiator is 1 to 10% by weight, more preferably 1 to 7% by weight, of the total radiation curable liquid weight.

A combination of two or more photo-initiators may be used. A photo-initiator system, comprising a photo-initiator and a co-initiator, may also be used. A suitable photo-initiator system comprises a photo-initiator, which upon absorption of actinic radiation forms free radicals by hydrogen abstraction or electron extraction from a second compound, the co-initiator. The co-initiator becomes the actual initiating free radical.

Irradiation with actinic radiation may be realized in two steps, each step using actinic radiation having a different wavelength and/or intensity. In such cases it is preferred to use 2 types of photo-initiators, chosen in function of the different actinic radiation used.

Suitable photo-initiators are disclosed in paragraphs [0077] to [0079] of EP 1637926 A (AGFA).

Inhibitors

Suitable polymerization inhibitors include phenol type antioxidants, hindered amine light stabilizers, phosphor type antioxidants, hydroquinone monomethyl ether commonly used in (meth)acrylate monomers, and hydroquinone, methylhydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, SUMILIZER™ GA-80, SUMILIZER™ GM and SUMILIZER™ GS produced by Sumitomo Chemical Co., Ltd.

Since excessive addition of these polymerization inhibitors will lower the sensitivity to curing of the radiation curable liquid, it is preferred that the amount capable of preventing polymerization be determined prior to blending. The amount of a polymerization inhibitor is generally between 200 and 20 000 ppm of the total radiation curable liquid weight.

Oxygen Inhibition

Suitable combinations of compounds which decrease oxygen polymerization inhibition with radical polymerization inhibitors are: 2-benzyl-2-dimethylamino-1-(4-morpholinophenyl)-butane-1 and 1-hydroxy-cyclohexyl-phenyl-ketone; 1-hydroxy-cyclohexyl-phenyl-ketone and benzophenone; 2-methyl-1[4-(methylthio)phenyl]-2-morpholino-propane-1-on and diethylthioxanthone or isopropylthioxanthone; and benzophenone and acrylate derivatives having a tertiary amino group, and addition of tertiary amines. An amine compound is commonly employed to decrease an oxygen polymerization inhibition or to increase sensitivity. However, when an amine compound is used in combination with a high acid value compound, the storage stability at high temperature tends to be decreased. Therefore, specifically, the use of an amine compound with a high acid value compound in ink-jet printing should be avoided.

Synergist additives may be used to improve the curing quality and to diminish the influence of the oxygen inhibition. Such additives include, but are not limited to ACTILANE™ 800 and ACTILANE™ 725 available from AKZO NOBEL, EBECRYL™ P115 and EBECRYL™ 350 available from UCB CHEMICALS and CD 1012, CRAYNOR™ CN 386 (amine modified acrylate) AND Craynor™ CN 501 (amine modified ethoxylated trimethylolpropane triacrylate) available from CRAY VALLEY.

The content of the synergist additive is in the range of 0 to 50% by weight, preferably in the range of 5 to 35% by weight, based on the total weight of the radiation curable liquid.

Plasticizers

Plasticizers are usually used to improve the plasticity or to reduce the hardness of adhesives, sealing compounds and coating compositions. Plasticizers are liquid or solid, generally inert organic substances of low vapour pressure.

Suitable plasticizers are disclosed in paragraphs [0086] to [0089] of EP 1637926 A (AGFA).

The amount of plasticizer is preferably at least 5% by weight, more preferably at least 10% by weight, each based on the total weight of the radiation curable liquid.

The plasticizers may have molecular weights up to 30 000 but are preferably liquids having molecular weights of less than 5,000.

Elastomers

The elastomer may be a single binder or a mixture of various binders. The elastomeric binder is an elastomeric copolymer of a conjugated diene-type monomer and a polyene monomer having at least two non-conjugated double bonds, or an elastomeric copolymer of a conjugated diene-type monomer, a polyene monomer having at least two non-conjugated double bonds and a vinyl monomer copolymerizable with these monomers.

Preferred elastomers are disclosed in paragraphs [0092] and [0093] of EP 1637926 A (AGFA).

Surfactants

The surfactant(s) may be anionic, cationic, non-ionic, or zwitter-ionic and are usually added in a total quantity below 20% by weight, more preferably in a total quantity below 10% by weight, each based on the total radiation curable liquid weight.

A fluorinated or silicone compound may be used as a surfactant, however, a potential drawback is bleed-out after image formation because the surfactant does not cross-link. It is therefore preferred to use a copolymerizable monomer having surface-active effects, for example, silicone-modified acrylates, silicone modified methacrylates, fluorinated acrylates, and fluorinated methacrylates.

Colorants

Colorants may be dyes or pigments or a combination thereof. Organic and/or inorganic pigments may be used.

Suitable dyes and pigments include those disclosed by ZOLLINGER, Heinrich. Color Chemistry: Syntheses, Properties, and Applications of Organic Dyes and Pigments. 3rd edition. WILEY-VCH, 2001. ISBN 3906390233. p. 550.

Suitable pigments are disclosed in paragraphs [0098] to [0100] of EP 1637926 A (AGFA).

The pigment is present in the range of 0.01 to 10% by weight, preferably in the range of 0.1 to 5% by weight, each based on the total weight of radiation curable liquid.

Solvents

The radiation curable liquid preferably does not contain an evaporable component, but sometimes, it can be advantageous to incorporate an extremely small amount of a solvent to improve adhesion to the ink-receiver surface after UV curing. In this case, the added solvent may be any amount in the range of 0.1 to 10.0% by weight, preferably in the range of 0.1 to 5.0% by weight, each based on the total weight of radiation curable liquid.

Humectants

When a solvent is used in the radiation curable liquid, a humectant may be added to prevent the clogging of the nozzle, due to its ability to slow down the evaporation rate of radiation curable liquid.

Suitable humectants are disclosed in paragraph [0105] of EP 1637926 A (AGFA).

A humectant is preferably added to the radiation curable liquid formulation in an amount of 0.01 to 20% by weight of the formulation, more preferably in an amount of 0.1 to 10% by weight of the formulation.

Biocides

Suitable biocides include sodium dehydroacetate, 2-phenoxyethanol, sodium benzoate, sodium pyridinethion-1-oxide, ethyl p-hydroxy-benzoate and 1,2-benzisothiazolin-3-one and salts thereof. A preferred biocide for the radiation curable liquid suitable for the method for manufacturing a flexographic printing master according to the present invention, is PROXEL™ GXL available from ZENECA COLOURS.

A biocide is preferably added in an amount of 0.001 to 3% by weight, more preferably in an amount of 0.01 to 1.00% by weight, each based on radiation curable liquid.

Preparation of Radiation Curable Liquids

The radiation curable liquid may be prepared as known in the art by mixing or dispersing the ingredients together, optionally followed by milling, as described for example in paragraphs [0108] and [0109] of EP 1637926 A (AGFA).

EXAMPLES

Materials

All materials used in the following examples were readily available from standard sources such as ALDRICH CHEMICAL Co. (Belgium) and ACROS (Belgium) unless otherwise specified. The water used was deionized water.

SR506D is isobornylacrylate available as SARTOMER™ SR506D from SARTOMER. It has a viscosity of 10 mPa·s at 25° C. SR610 is polyethyleneglycol 60 diacrylate available as SARTOMER™ SR610 from SARTOMER. It has a viscosity of 90 mPa·s at 25° C. GENOMER™ 1122 is 2-acrylic acid 2-(((acryl-amino)carbonyl)oxy)ethylester available from RAHN AG (Switzerland). It has a viscosity of 30 mPa·s at 25° C.

Genocure™ EPD is the co-initiator ethyl 4-dimethylaminobenzoate available from RAHN AG (Switzerland).

DAROCUR™ ITX is the photo-initiator isopropylthioxanthone available from CIBA.

DAROCUR™ TPO is the photo-initiator 2,4,6-trimethylbenzoyl-diphenyl-phosphineoxide available from CIBA.

EBECRYL™ 1360 is a polysiloxane hexa acrylate from UCB S.A. (Belgium).

:ANUVIA™ Cyan is UV curable cyan inkjet ink available from AGFA GRAPHICS.

PET100 is a 100 μm subbed polyethylene terephthalate substrate with on the backside an antiblocking layer with antistatic properties available from AGFA-GEVAERT as P100C S/AS (Type 198).

PET175 is a 175 μm subbed polyethylene terephthalate substrate with on the backside an antiblocking layer with antistatic properties available from AGFA-GEVAERT as P175C S/AS (Type 264).

Measurements

1. Viscosity

The viscosity was measured with a MCR500 Rheometer (manufacturer Anton Paar), equipped with a CC27 spindle and a coaxial cylinder geometry (shear rate 10 s$^{-1}$).

2. Surface Tension

The surface tension of the inkjet inks was measured with a KRÜSS tensiometer K9 at 25° C. after 60 seconds.

3. $D_{max}$

The maximum optical density $D_{max}$ was measured using a MacBeth RD918SB densitometer with a filter complementary to the colour of the printing ink used.

Example 1

This example illustrates that flexographic printing masters including a mesa relief are less susceptible to damage by handling or during printing.

Preparation of the Flexographic Print Masters

Two flexographic print masters FPM-1 and FPM-2 were made using a custom-built 3D-inkjet printer having a rotatable drum using an UPH-print head (available from AGFA) for jetting an :ANUVIA™ Cyan inkjet ink at 1 dpd. The inkjet printing conditions were: head temperature of 45° C., voltage=17V, sample clock=250 ns, 720 dpi and drum rotation speed=300 mm/s.

The raw sleeve was a durable fibreglass base ROTEC™ Basic Sleeve available from ROTEC having an internal diameter of 130.623 mm and whereupon a PET100 substrate was mounted with a double sided mounting tape (Lohmann DUPLOMONT™ 9052 compressible tape). The curing device was made up of UV-LED's emitting at 365 nm from NICHIA.

For the first flexographic print master FPM-1, a 1 cm×1 cm image relief consisting of 16 rows of 16 separate dot reliefs (40.6 lpi) was made by jetting consecutive layers having a height of approximately 5 μm each on the PET100 substrate. The image relief had a top hat profile with a slope angle of 70°, a total height of 0.54 mm and a height of the top hat segment of 50 μm.

For the second flexographic print master FPM-2, first a mesa relief having a height of 0.54 mm was built up by jetting consecutive layers having a height of approximately 5 μm each on the PET100 substrate. Then a similar 1 cm×1 cm image relief consisting of 16 rows of 16 dot reliefs was made by jetting consecutive layers having a thickness of approximately 5 μm each on the mesa relief having a height of 0.42 mm and a slope angle of 50° of its edges. The image relief had a top hat profile with a slope angle of 70°, a total height of 120 μm and a height of the top hat segment of 50 μm. A print result with the flexographic print masters FPM-1 and FPM-2 would thus have the same resolution.

Evaluation and Results

The image reliefs of the flexographic print masters FPM-1 and FPM-2 were then wiped once from left to right with a sanding paper having a roughness P800. It was observed that 205 dot reliefs out of the 256 present in the image relief of the flexographic print master FPM-1 had been broken, while none of dot reliefs out of the image relief of the flexographic print master FPM-2 were broken. Only a slight reduction of the height of the top hat segment was observed.

Example 2

This example illustrates the making of a flexographic printing master having an image relief on a mesa relief Preparation of the Radiation Curable Liquid LIQ-1

A jettable radiation curable liquid LIQ-1 was made by mixing the components according to Table 1 for 30 minutes. The resulting liquid had a surface tension of 28.7 mN/m.

TABLE 1

| Component | wt % |
|---|---|
| SR506D | 45.90 |
| SR610 | 19.10 |
| GENOMER ™ 1122 | 14.40 |
| SANTICIZER ™ 278 | 5.60 |
| GENOCURE ™ EPD | 5.00 |
| DAROCUR ™ ITX | 5.00 |
| DAROCUR ™ TPO | 4.96 |
| EBECRYL ™ 1360 | 0.04 |

Preparation of the Flexographic Print Masters

The flexographic print masters FPM-3 to FPM-5 were made using a custom-built 3D-inkjet printer having a rotatable drum using an UPH-print head (available from AGFA) for jetting the jettable radiation curable liquid LIQ-1 at 1 dpd on a raw sleeve. The inkjet printing conditions were head temperature of 45° C., voltage=17V, sample clock=250 ns, 720 dpi and speed=300 mm/s.

The raw sleeve was a durable fibreglass base ROTEC™ Basic Sleeve available from ROTEC having an internal diameter of 130.623 mm and whereupon a PET175 substrate was mounted with a double sided mounting tape (Lohmann DUPLOMONT™ 9052 compressible tape). The curing device was made up of UV-LED's emitting at 365 nm from NICHIA.

For the flexographic print masters FPM-3 to FPM-5, an elastomeric floor having a height of 0.54 mm was built up by jetting consecutive layers of the radiation curable liquid LIQ-1 having a thickness of approximately 5 μm each on the PET175 substrate.

For the flexographic print masters FPM-3 to FPM-5, a mesa relief having a height of 0.54 mm was built up by jetting consecutive layers of the radiation curable liquid LIQ-1 having a thickness of approximately 5 μm each on the elastomeric floor.

Then grinding was carried out on the top surface of the mesa relief of the flexographic printing masters FPM-4 and FPM-5 manually by kiss-contacting a straight plastic support provided with a mounted sheet of ultra fine sand paper 800 grit against the printing surface on top of the relief image On the mesa relief of the flexographic print masters FPM-3 to FPM-5, an image relief having a top hat profile with a height of 120 μm was jetted. The image relief included a solid area (100%), lines of different width (70, 105, 140 and 175 μm) and areas with dots, including 2% and 24% dots (@ 103 lpi). After the relief image has been gradually built up by inkjet, whereby each jetted layer was contiguously cured with UV-A light, a final UV-C post curing step is carried out to remove surface tackiness. This curing step with UV-C was carried out under a $N_2$-atmosphere with 254 nm TL-lamps.

Then grinding was carried out on the top surface of the image relief of the flexographic printing master FPM-5 manually by kiss-contacting a straight plastic support provided with a mounted sheet of ultra fine sand paper 800 grit against the printing surface on top of the relief image.

Flexographic Printing Test

A flexographic printing test was carried out with the flexographic printing masters FPM-3 to FPM-5 on a laboratory flexographic printing press RK Koater available from RK PRINT-COAT INSTRUMENTS Ltd. (UK), provided with a type 360 anilox roller (cell volume 7.8 cm$^3$/m$^2$ @ 60° screen angle) and a steel doctor blade. Printing speed was aimed to be 32.5 m/min (position 7).

The printing ink was Aqua Base Plus Blue ET-51405, a water based pigment flexographic ink for self-adhesive labels from ROYAL DUTCH PRINTING INK FACTORIES VAN SON.

Printing was performed on Arctic Gloss Paper 150 g/m$^2$, a substrate available from ARCTIC PAPER.

Evaluation and Results

The flexographic printing results obtained with the flexographic printing masters FPM-3 to FPM-5 are shown in Table 2.

TABLE 2

| | Flexographic printing results | | |
|---|---|---|---|
| | FPM-3 | FPM-4 | FPM-5 |
| Mesa relief grinded | No | Yes | Yes |
| Image relief grinded | No | No | Yes |
| Original dot area % (24% @ 103 lpi) | 43% | 38% | 52% |
| Dot gain (*) | 19% | 14% | 28% |
| $D_{max}$ | 1.53 | 1.64 | 1.74 |
| Reproducible uninterrupted line width | 105 μm | 105 μm | 70 μm |

(*) The dot gain obtained with a DuPont CYREL HIQ printing plate is 29% (orig. dot area % = 25% @ 110 lpi).

Measurements were Performed Using the Murray-Davies Formula.

The larger $D_{max}$ of FPM-5 is a direct result of grinding the mesa relief and the image relief.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method for making a flexographic printing master comprising the steps of:
   providing a flexographic printing support;
   providing an inkjet printing device;

image-wise applying at least one layer with the inkjet printing device on the flexographic printing support to obtain a plurality of mesa reliefs, the plurality of mesa reliefs being separate from each other and each of the plurality of mesa reliefs defining a common base for neighbouring image reliefs; and image-wise applying at least one layer with the inkjet printing device on each of the plurality of mesa reliefs to obtain the neighbouring image reliefs; wherein the plurality of mesa reliefs include at least two mesa reliefs of a different height.

2. The method according to claim 1, wherein the neighbouring image reliefs have a top hat profile including a top hat segment on a plateau of a sloped segment.

3. The method according to claim 2, further comprising the step of:

grinding the neighbouring image reliefs including the top hat profile.

4. The method according to claim 1, wherein the plurality of mesa reliefs have a height in a range from 50 µm to 1 mm.

5. The method according to claim 1, wherein the plurality of mesa reliefs and the neighbouring image reliefs have a different chemical composition.

6. The method according to claim 1, wherein the inkjet printing device includes a first set of nozzles and a second set of nozzles arranged to print a relief on the flexographic printing support; wherein the first set of nozzles is used to print the plurality of mesa reliefs on the flexographic printing support; and the second set of nozzles is used to print the neighbouring image reliefs on the plurality of mesa reliefs; and a nozzle diameter of a nozzle of the first set of nozzles is at least 25% larger than a nozzle diameter of a nozzle of the second set of nozzles.

7. The method according to claim 1, wherein the flexographic printing support includes an elastomeric floor.

8. An inkjet printed flexographic printing master comprising:

a flexographic printing support;

an elastomeric floor on the flexographic printing support;

a plurality of mesa reliefs on the elastomeric floor and arranged to protect the inkjet printed flexographic printing master against damage during handling; and neighbouring image reliefs on each of the plurality of mesa reliefs; wherein the plurality of mesa reliefs are separate from each other and each of the plurality of mesa reliefs defines a common base for the neighbouring image reliefs; and the plurality of mesa reliefs are only present in portions of the inkjet printed flexographic printing master including the neighbouring image reliefs, and no mesa relief is present in portions of the inkjet printed flexographic printing master where the neighbouring image reliefs are absent; wherein the plurality of mesa reliefs include at least two mesa reliefs of a different height.

* * * * *